US007757369B2

(12) United States Patent
Kassay et al.

(10) Patent No.: US 7,757,369 B2
(45) Date of Patent: Jul. 20, 2010

(54) SELF LEVELING BRACKET/STABILIZER FOR FLUORESCENT LIGHTING FIXTURES WITH CONTROLLED UPLIGHT CAPABILITY

(76) Inventors: Charles E. Kassay, 500 C Alexander Ave., Henderson, NC (US) 27536; Suzanne M. Pane, 500 C Alexander Ave., Henderson, NC (US) 27536; Marc A. Kassay, 500 C Alexander Ave., Henderson, NC (US) 27536; John Peter Kassay, 500 C Alexander Ave., Henderson, NC (US) 27536

( * ) Notice: Subject to any disclaimer, the term of this patent is extended or adjusted under 35 U.S.C. 154(b) by 1 day.

(21) Appl. No.: 12/381,223

(22) Filed: Mar. 9, 2009

(65) Prior Publication Data

US 2009/0231837 A1 Sep. 17, 2009

Related U.S. Application Data

(63) Continuation of application No. 11/430,347, filed on May 9, 2006, now Pat. No. 7,500,762, which is a continuation-in-part of application No. 10/750,391, filed on Dec. 31, 2003, now Pat. No. 7,070,303.

(51) Int. Cl.
*B23P 11/00* (2006.01)

(52) U.S. Cl. .................... 29/525.01; 362/368; 362/367; 362/404

(58) Field of Classification Search .............. 29/525.01, 29/525.02, 525.11, 525.13, 469; 362/147, 362/148, 217–225, 260, 368, 370, 404
See application file for complete search history.

(56) References Cited

U.S. PATENT DOCUMENTS 2,194,431 A 3/1940 O'Neil
2,222,319 A 11/1940 Millar
2,281,377 A 4/1942 Ohm
2,327,230 A 8/1943 Weber
2,327,231 A 8/1943 Westcott
2,348,930 A 5/1944 Schepmoes
2,433,819 A 12/1947 Scribner
2,474,308 A 6/1949 Franck
2,474,341 A 6/1949 Wince
2,532,528 A 12/1950 Zuley
2,545,058 A 3/1951 Walsh
2,567,779 A 9/1951 Mitchell
2,619,483 A 11/1952 Baumgartner (Continued)

FOREIGN PATENT DOCUMENTS

DE 94577 7/1956

(Continued)

*Primary Examiner*—David P Bryant
*Assistant Examiner*—Bayan Salone
(74) *Attorney, Agent, or Firm*—Alfred M. Walker

(57) ABSTRACT

A fluorescent light fixture is suspended by a longitudinally extending trapezoidal pendant bracket/stabilizer. The trapezoidal pendant bracket/stabilizer includes a horizontally extending top brace and a pair of obliquely extending arms extending downward in opposite directions from the top brace in a trapezoidal crossection. Each obliquely extending arm has a flat, horizontally and outwardly extending attachment foot extending longitudinally along a flat top surface of the fluorescent lamp fixture, wherein each attachment foot is attached to the flat top surface of the fluorescent lamp fixture. The horizontally extending top brace is attachable to a ceiling mounted fastener, such as a toggle hanger or other downwardly extending fastener.

3 Claims, 9 Drawing Sheets

U.S. PATENT DOCUMENTS 2,641,433 A 6/1953 Wright
2,642,251 A 6/1953 Janness
2,736,528 A * 2/1956 Le Brock .................... 248/317
2,936,991 A * 5/1960 Picha et al. ................. 248/343
3,643,088 A 2/1972 Osteen
3,735,329 A 5/1973 Funabashi
4,138,716 A 2/1979 Muhlethaler
4,367,417 A 1/1983 Casasanta
4,520,436 A 5/1985 McNair
4,595,969 A 6/1986 McNair
4,704,664 A 11/1987 McNair
4,779,178 A 10/1988 Spitz
4,802,073 A 1/1989 Plumly
4,839,781 A 6/1989 Barnes
4,922,393 A 5/1990 McNair
4,947,297 A 8/1990 Druffel
5,192,128 A 3/1993 Ngai
5,197,798 A 3/1993 Tickner
5,207,504 A 5/1993 Swift
5,343,373 A 8/1994 Tillotson
5,371,661 A 12/1994 Simpson
5,377,086 A 12/1994 Tickner
5,434,762 A 7/1995 Shemitz
5,473,522 A 12/1995 Kriz
5,523,931 A 6/1996 Kassay
5,528,473 A 6/1996 Kassay
5,555,162 A 9/1996 Shemitz
5,584,575 A 12/1996 Fickel
5,727,871 A 3/1998 Kotloff
5,806,967 A 9/1998 Scorus
5,988,829 A 11/1999 Holder
6,024,468 A 2/2000 Kassay
6,210,018 B1 4/2001 Kassay
6,428,183 B1 8/2002 McAlpin
6,505,953 B1 1/2003 Dahlen

FOREIGN PATENT DOCUMENTS

FR 1085180 1/1955
GB 878534 10/1961
JP 75204 3/1992

* cited by examiner

FIG. 14
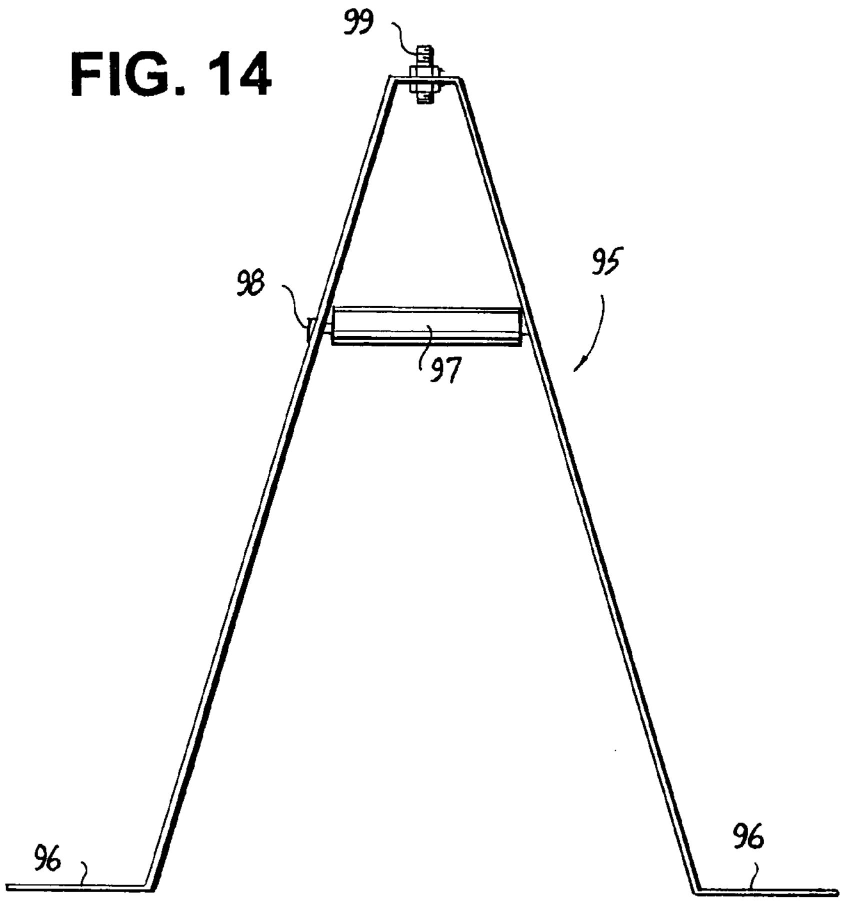
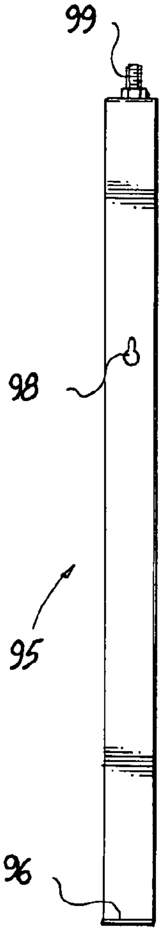
FIG. 15

SELF LEVELING BRACKET/STABILIZER FOR FLUORESCENT LIGHTING FIXTURES WITH CONTROLLED UPLIGHT CAPABILITY

RELATED APPLICATIONS

This application is a continuation of application Ser. No. 11/430,347, filed May 9, 2006 now U.S. Pat. No. 7,500,762, which application is a continuation-in-part of application Ser. No. 10/750,391, filed Dec. 31, 2003, now U.S. Pat. No. 7,070, 303 and claims priority under 35 U.S.C. §120 therefrom.

FIELD OF THE INVENTION

The present invention relates indoor lighting with controlled uptight capability.

BACKGROUND OF THE INVENTION

In order to make a large area visually comfortable, downlight fixtures often include some uptight capabilities, to reduce the "cave" effect caused by ceiling fixtures being too intense for the viewer to see the ceiling beyond the fixtures. The cave effect causes a glare-filled, enclosed effect, which increases eyestrain.

However, too much uplighting is inefficient and wasteful, not reflecting a large portion of emitted light back to the space below the fixture.

To provide uptight, it is known to have an open top, which wastes light usage, as much of the light is not reflected back to the space below the fixture. In addition, in general, however, lamp fixtures with open tops have a susceptibility to dirt accumulation.

Among related patents include U.S. Pat. No. 2,281,377 of Ohm, which has a slanted transparent/translucent wall but no reflector, which does not control uptight to a preferable maximum of 5-19% (by bent and concave angles of the reflector). Ohm's wall 13 is convex, so most light is not controlled. If a fixture were made similar to that of Ohm '377, wherein it would be fabricated without the lens, the fluorescent lamps would extend beyond the plane of the side of the fixture, allowing for excessive dirt accumulation thereon. Furthermore, if one would make a fixture similar to that of Ohm '377 with a non-translucent wall, the fixture efficiency would be greatly diminished. In addition, the lack of a photometrically designed reflector would diminish the obtainable efficiency of the fixture.

U.S. Pat. No. 2,534,182 of Schwartz has different angles for reflectors 31, 32, 33 that don't control uplighting. Their rounded lenses are not as efficient as using a flat lens.

In U.S. Pat. No. 2,548,500 of Sachs, the position of the reflector 15 beneath the fluorescent lamp tubes causes 50% of light up and 50% down, not a preferable controlled 5-19% as uptight. Also, if one removes the item 15 of Sachs, one accumulates dirt within the fixture.

U.S. Pat. No. 6,428,183B1 of McAlpin gets 100 percent of light up with visual waste and needs extra upper lamps 32, 33 with separate mounts. These upper lamps are exposed and subject to dirt accumulation.

U.S. Pat. No. 2,619,583 of Baumgartner describes a fluorescent fixture with and end reflector 72 spaced from the outer edge of a vertical wall to direct a portion of the light upwardly.

U.S. Pat. No. 6,210,018 of Kassay describes an angled V-shaped lighting fixture having a seven-sided polygonal fastening bracket with angled bottom edges engaging the V-shaped top surface of the angled fixture.

U.S. Pat. No. 5,806,967 of Soorus is mainly a V-shaped uptight fixture open at top, so dirt will invariably accumulate therein.

U.S. Pat. No. 2,545,058 of Walsh has an open top with susceptibility to dirt accumulation. Walsh is mainly uptight only as in FIG. 10 therein.

U.S. Pat. No. 2,474,341 of Wince doesn't have a reflector.

U.S. Pat. No. 2,348,930 of Shepmoes has a V-shape end view configuration of lamp fixtures. Downward light is less than 70%.

U.S. Pat. No. 2,327,230 of Weber is only concerned with access removal of the lens portion 27. Lighting inefficiency is similar to Shepnoes.

U.S. Pat. No. 2,320,829 of Naysmith and U.S. Pat. No. 2,323,002 of Baker both describe V-shaped arrangement of lamps, which does not control uptight.

Therefore, there is a need to provide a fluorescent lamp fixture which controls uptight to a desirable level, without wasting excess light, while significantly reducing an undesirable cave effect and without the tendency to accumulate dirt within the fixture.

OBJECTS OF THE INVENTION

It is therefore an object of the present invention to provide a fluorescent lamp fixture which controls uptight to a desirable level, without wasting excess light, while significantly reduces an undesirable cave effect and without the tendency to accumulate dirt within the fixture.

It is a further object of the present invention to provide labor saving features to install fluorescent lamp fixtures rapidly where applicable.

SUMMARY OF THE INVENTION

In keeping with these objects and others, which may become apparent, the fixtures of this invention accommodate straight fluorescent tube lamps of a variety of lengths and electrical design, for example popular four foot sizes. These fixtures have a full upper housing protecting all lamps from the accumulation of dust and debris while providing a controlled amount (5 to 19%) of total light output to uplighting, thereby lighting ceiling and wall areas above the fixture, to negate the so-called "cave effect". The percentage range of 5 to 19 percent of total uplighting is controlled relative to the quantity of lamps utilized, the angle of the reflector and the height of the outside section of the fixture, which also impacts the angle of the outboard reflector.

The fixtures of this invention have a central section (from an end view) aimed directly below the fixture with lamp or lamps within a concave reflector or reflectors. Wing sections at an oblique angle extend sideways from the central section, carrying their own lamps and reflectors with totally or largely open distal ends, thereby accommodating uplighting in a controlled fashion. The uplighting provided is at an oblique angle from the fixture, as contrasted from prior-art fixtures with dedicated uptight lamps, or direct vertical upward lenses or windows, which would reflect uptight directly down from the ceiling surface.

These lighting fixtures preferably incorporate a trapezoidal pendant bracket, which accurately positions the fixture with respect to a pendant pipe and prevents any tendency of the fixture from deviating from orthogonal orientation. However, the pendant bracket/stabilizer of the present invention is usable on any type of suspended light fixture, to stabilize the fixture in place.

By "pendant pipe" it is assumed that the vertically and longitudinally pipe is either a hollow conduit having electrical wiring therein or a solid rod having electrical wiring adjacent thereto.

In one embodiment the fixture has no lens and the oblique housing sides are shortened to accommodate uplighting. In a second embodiment, a high efficiency lens is used for downlighting. Then the oblique housing sides are fitted with windows also, which are glazed with flat high efficiency lens panels to accommodate uplighting. Each of these embodiments can accommodate a variety of lamp configurations ranging from three to eight fluorescent lamps per fixture.

A trapezoidal pendant bracket/stabilizer allows the fixture to be stem hung from a pipe, such as a ¾ inch galvanized conduit stem, creating a very strong and rigid installation. This is used for gymnasiums or other locations where impact is an issue. It also creates a clean aesthetically pleasing installation. This takes some of the stress off of the pipe connection at the top of the fixture, negating any torque if the fixture is hit in anyway. The impact is taken by the points of attachment of the pendant stabilizer. It also suspends the fixture level to the floor. The bracket has a screw which when tightened tightens the fit around the stem While the pendant bracket/stabilizer and pendant pipe allow a fixture to be stem hung from a ¾ inch galvanized conduit stem creating a very strong and rigid installation, where impact resistance is not a factor, a toggle hanger of this invention can be used for a more rapid installation. The toggle hanger is installed at the top of the pendant pipe allowing the fixture to be quickly attached to a an eye bolt at ceiling level by just inserting a toggle bolt through both eye bolt and toggle hanger mounting flange and tightening.

The toggle hanger is an extension of the pendant bracket/stabilizer system. Because it is installed on the top of the stem that goes through the pendant bracket/stabilizer, it allows for a quick installation where an eye bolt is already existing/or will be installed at the ceiling. The installer installs the fixture by just inserting the toggle through the eye bolt and tightening, eliminating the need for an expensive connection point at the ceiling and streamlining the installation to save labor. The unit is designed to support the weight through the two sides of the toggle hanger and centers the hang point to directly above the stem to guarantee a level hang of the fixture. The toggle hanger's best feature is that it allows for very rapid installations.

A second alternative mounting feature is the cost-saving quick bracket™ of this invention which replaces both the pendant bracket/stabilizer and the pendant pipe. The quick bracket™ has the general trapezoidal shape of the pendant bracket/stabilizer, but it is sized vertically to place the fixture at the desired height from the ceiling, for example, lengths from 18 inches to 48 inches are available. The top of the quick bracket™ can be used with an existing threaded rod, a new threaded rod, or a hook can be installed to couple to an existing eye bolt. An optional removable handle is used to streamline the installation.

In the second alternative embodiment, the bracket, like the pendant bracket/stabilizer, also guarantees that the fixture suspends level to the floor due to the spread of the points of attachment and the width of the material. It is an economy hanging system that does not require a stem, thereby eliminating several costly components in the hanging of the fixture. It also allows for a rapid installation. The top of the bracket can be used with an existing threaded rod when replacing existing fixtures or with the installation of a new threaded rod. A hook can also be fastened to the top of the bracket to allow for rapid installation where an eye bolt is already existing (retrofit of existing lighting system) or will be installed. The handle is totally portable and goes from fixture to fixture to allow for ease of handling and ease of holding while installing it. This bracket can come in a plurality of sizes, in lengths from 18 inches to 48 inches.

BRIEF DESCRIPTION OF THE DRAWINGS

The present invention can best be understood in connection with the accompanying drawings. It is noted that the invention is not limited to the precise embodiments shown in drawings, in which:

FIG. 14 is a front elevation of the quick bracket™ of FIG. 13; and,

FIG. 15 is a side elevation of the quick bracket™ of FIG. 13 showing one of the slotted holes for attachment of the mounting handle.

DETAILED DESCRIPTION OF THE INVENTION

Figure 1:
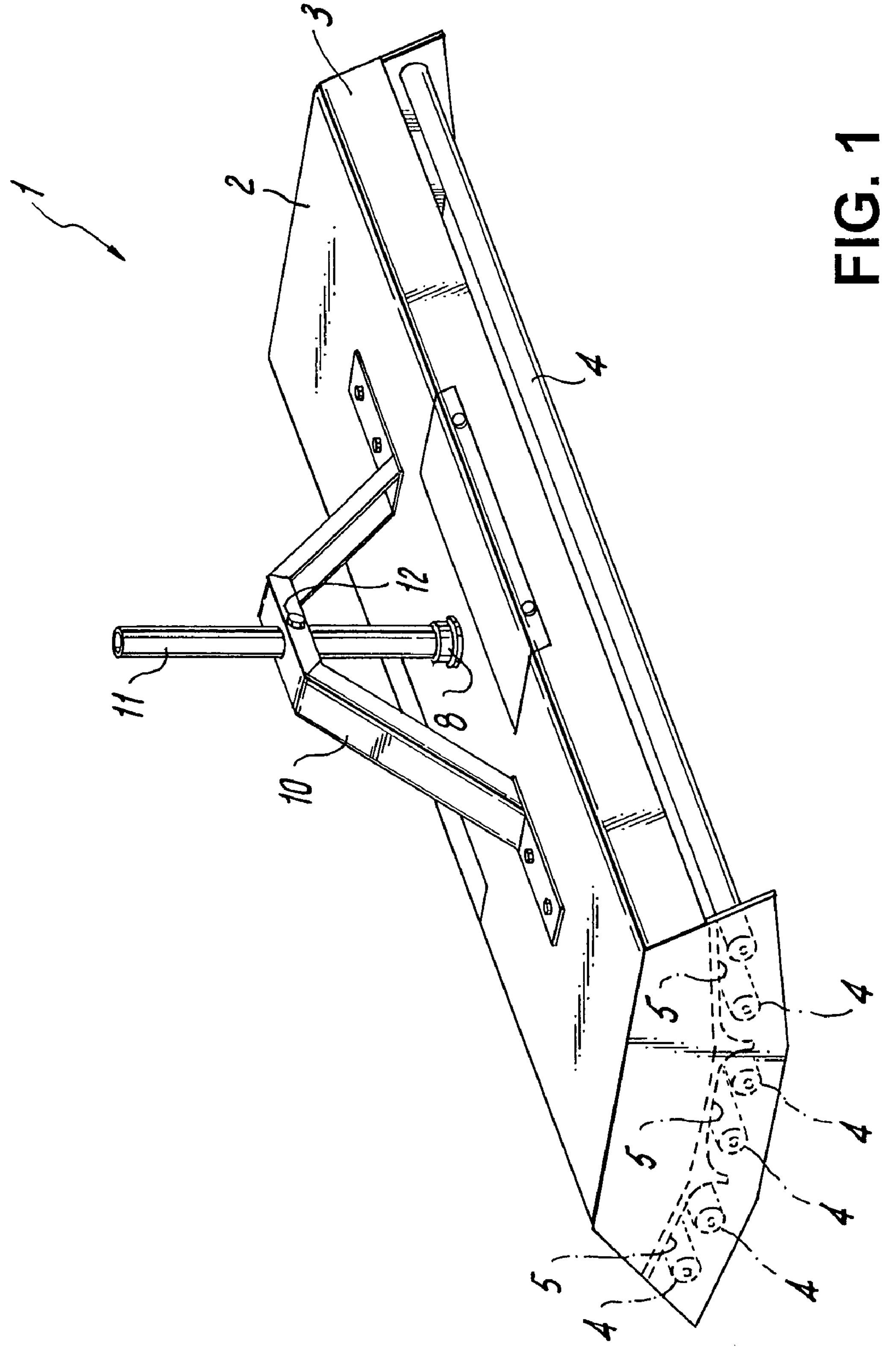
FIG. 1 is a Perspective view of a fluorescent lamp fixture of this invention with no lens.

FIG. 1 shows the first embodiment of this invention, wherein fixture 1 uses no lenses. Fixture 1 has six straight fluorescent tubes 4 within housing 2 with shortened oblique walls 3. Central concave reflector 6 is aimed straight down while side reflectors 5 are angled obliquely and have no curved section (or a very truncated one) at their distal ends. Reflector surface finish can vary, however a white finish, a specular reflector, or an enhanced specular reflector surface with 95% reflectivity are currently offered.

Pendant pipe 11 is used to attach fixture 1 to a ceiling structure; it also carries wiring within. It is mounted in hub 8 and is located accurately by trapezoidal pendant bracket 10 and secured by pendant screw 12. However, pendant bracket 10 is usable on any type of suspended light fixture, to stabilize the fixture in place.

Figure 2:
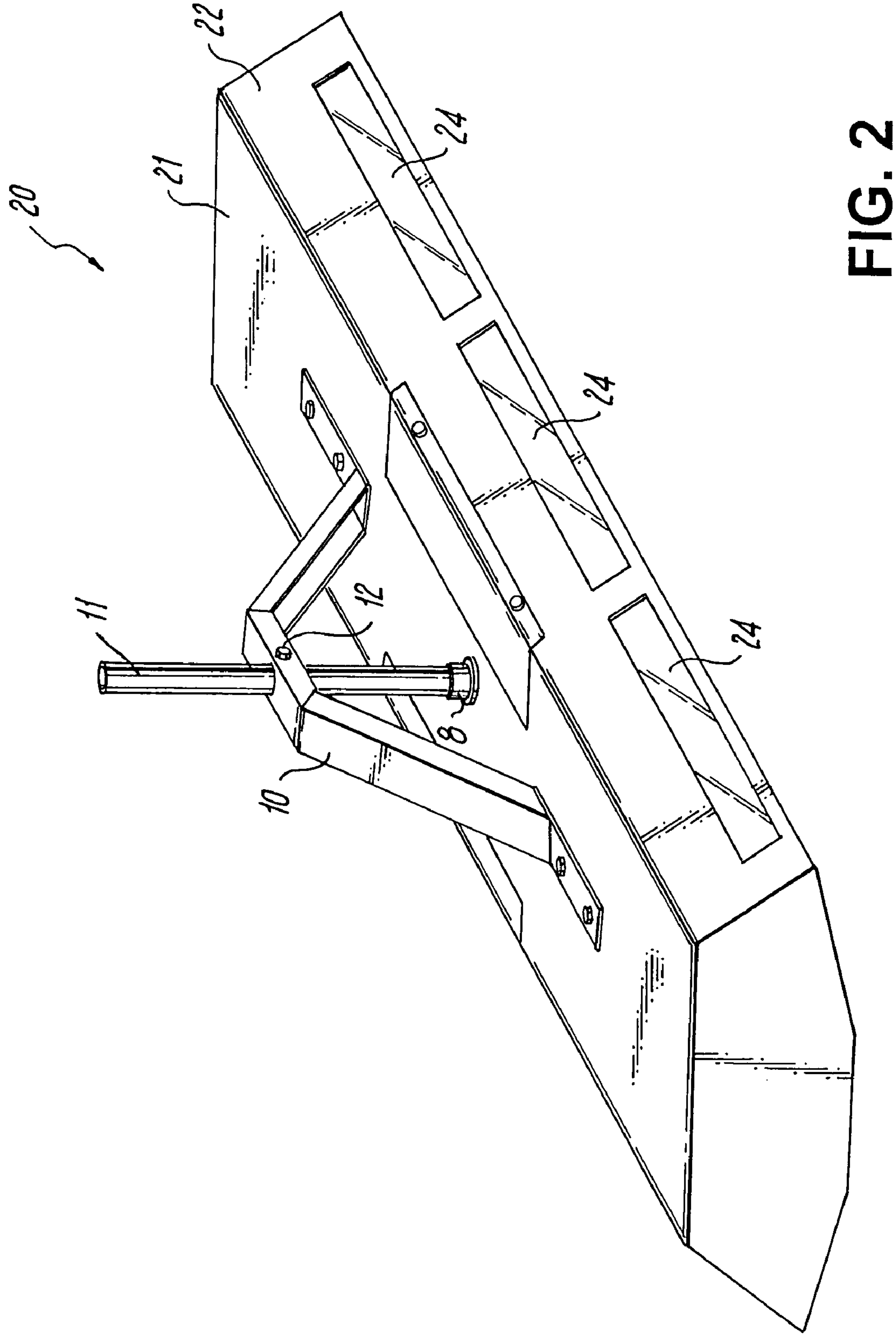
FIG. 2 is a Perspective view of a fluorescent lamp fixture of a second embodiment of this invention incorporating lenses.

In a second embodiment, fixture 20 of FIG. 2 has housing 21 with full oblique walls 22. Walls 22 have three rectangular windows 24 with flat high efficiency lenses to permit a controlled amount of uplighting.

Figure 3:
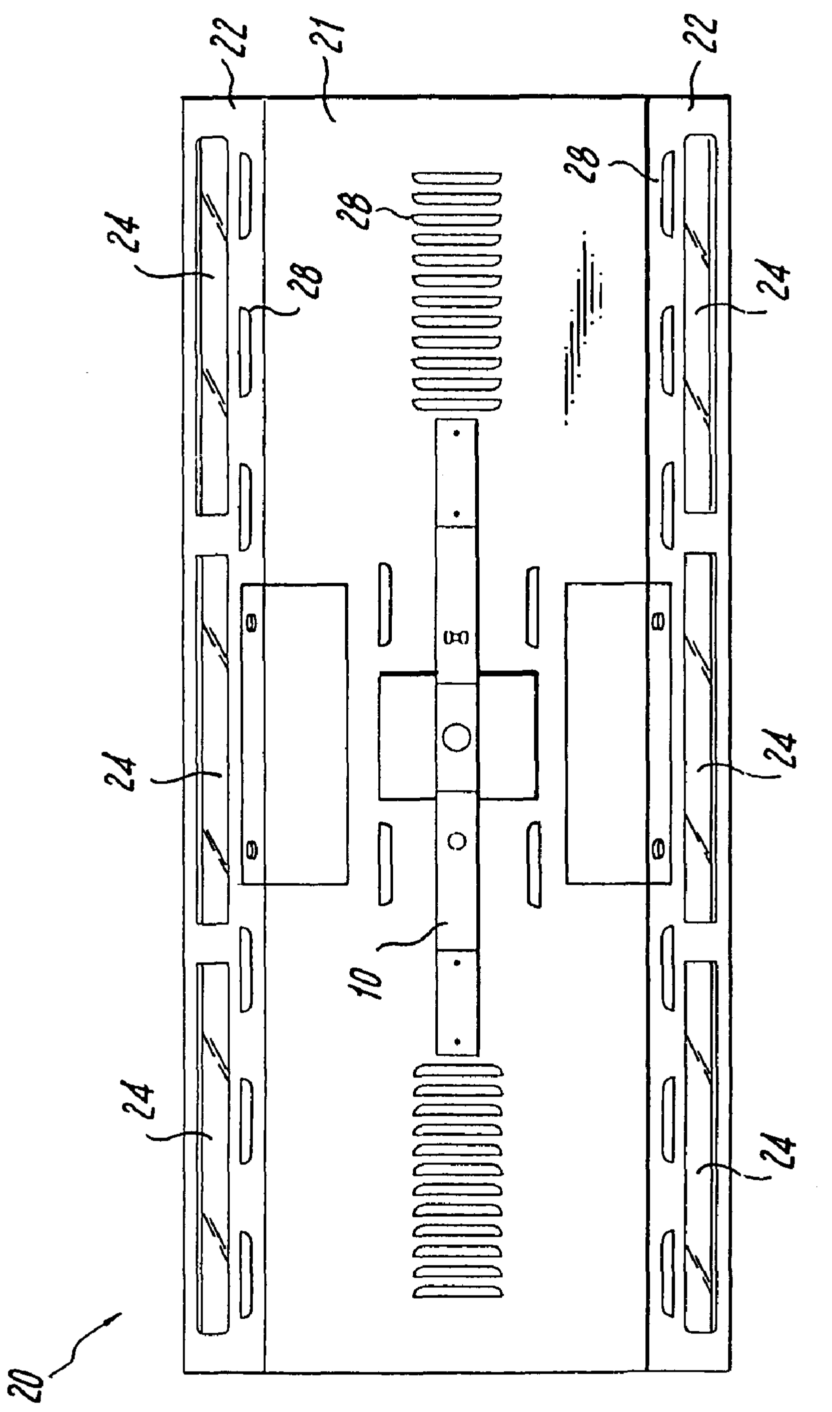
FIG. 3 is a Top plan view of a fluorescent lamp fixture of this invention (shown with lenses)
Figure 4:
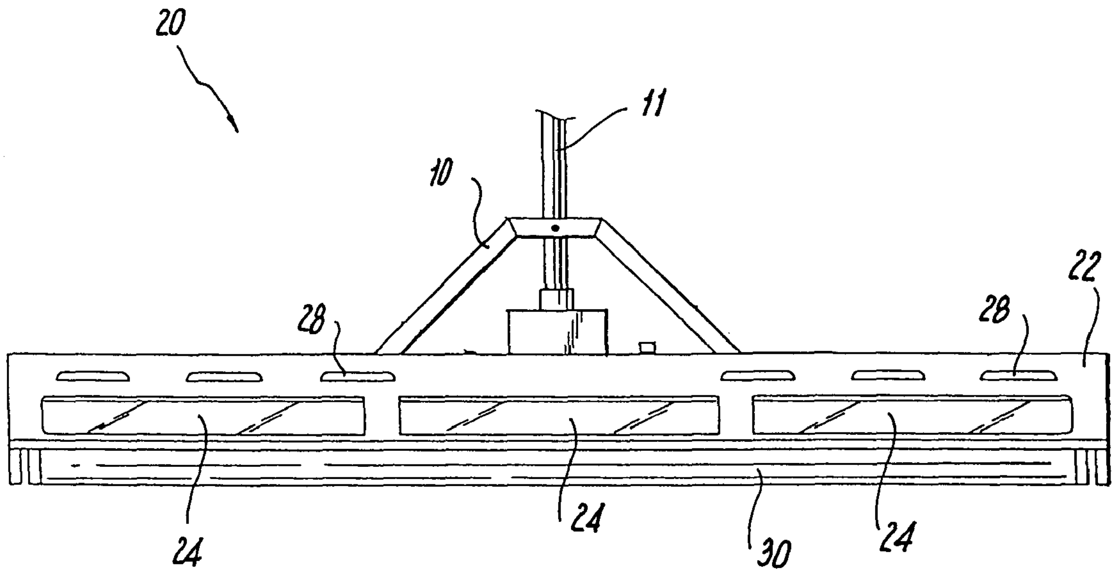
FIG. 4 is a Side elevational view of the fluorescent lamp fixture of FIG. 3.
Figure 5:
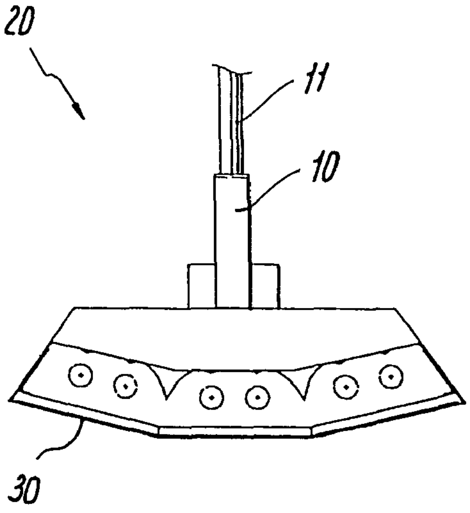
FIG. 5 is an End view of the fluorescent lamp fixture of FIG. 3.

FIGS. 3, 4, and 5 present top, side and end views of fixture 20 respectively. Vent louvers 28 are used to permit air circulation for cooling of ballasts and lamps while excluding dust contamination. High efficiency downlight lens 30 covers the fluorescent tubes.

A variety of lamp configurations for the fixtures of this invention are shown in the end views of FIGS. 6-10.

Figure 6:
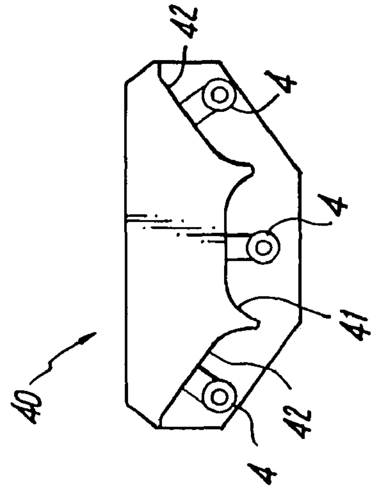
FIG. 6 is an End view of a 3-lamp configuration of a fluorescent lamp fixture of this invention.

For example, FIG. 6 shows a 3-lamp fixture 40 with a single lamp 4 in central reflector 41 and a single lamp in each side reflector 42.

Figure 7:
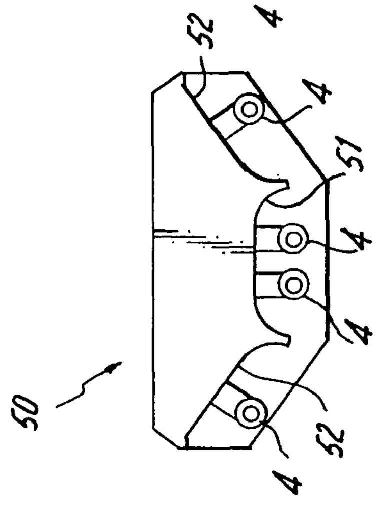
FIG. 7 is an End view of a 4-lamp configuration of a fluorescent lamp fixture of this invention.

FIG. 7 shows a 4-lamp fixture 50 with two lamps within central reflector 51 and single lamps within side reflectors 52.

Figure 8:
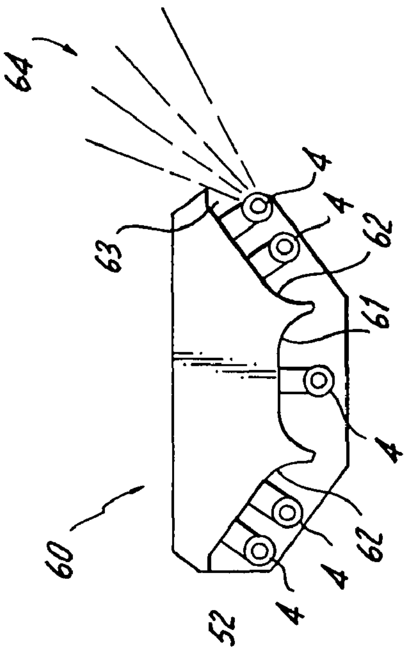
FIG. 8 is an End view of a 5-lamp configuration of a fluorescent lamp fixture of this invention, also indicating geometric features permitting a controlled amount of uplighting.

FIG. 8 shows a 5-lamp configuration 60 with a single lamp in central reflector 61 and two lamps in each side reflector 62. Uplighting rays 64 are shown emanating from right side to illustrate the geometric relationships between the lamp 4 location with respect to reflector 62, truncated end curve 63 and tube 4 surface. Reflector end 63 provides the uptight cut-off and the structural configuration of the reflectors, lamp location, oblique angle, and lamp fixture population permits design of fixtures with uptight percentage fixed as desired, preferably between 5-19% of total.

Figure 5A:
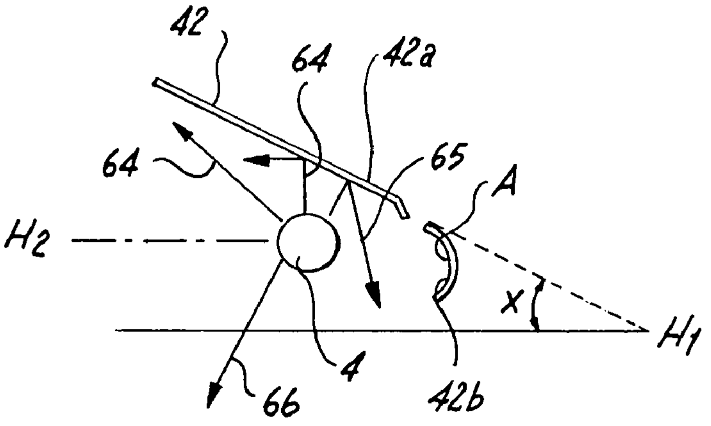
FIG. 5A is a close-up detail side view showing the reflectance of the light rays of fluorescent lamps of the fluorescent lamp fixture of this invention, due to the angle and arc of the reflector having an oblique portion and an arcuate portion.

For example, FIG. 5A shows the reflectance of the light rays 64, 65 and 66 of fluorescent lamps 4 due to the angle X and arc A of the reflector 42. Reflector 42 has a straight oblique portion 42*a* and an arcuate portion 42*b*. A certain portion of rays, emitted from lamp 4 designated as rays 64, are either emitted upward or are reflected off of portions of reflector 42 in an upward direction. Another portion of rays designated as rays 65 are emitted and directed up, but reflected down by either the straight oblique portion 42*a* or the arcuate portion 42*b* of reflector 42. A third portion of rays designated as rays 66 are emitted and directed down. Therefore rays 64 are the only light rays which constitute any uplighting of light from fixture 42. The amount of uplighting is controlled by controlling the angle X of straight oblique portion 42*a* off of imaginary horizontal line H1 and the arc A off arcuate portion 42*b*, off of imaginary horizontal line H1. As a result, a certain percentage of light, such as, for example, 5 to 19 percent, constitutes uptight directed above imaginary horizontal line H2 through the middle of lamp 4, either directly upward from lamp 4 or indirectly upward from lamp 4 via reflector portions 42*a* or 42*b*. The remaining portion of emitted rays are either emitted indirectly downward from lamp 4 below imaginary horizontal line H2 off of the center of lamp 4, via reflector portions 42*a* and/or 42*b*, or directly downward in the form of rays 66 from lamp 4.

Figure 5B:
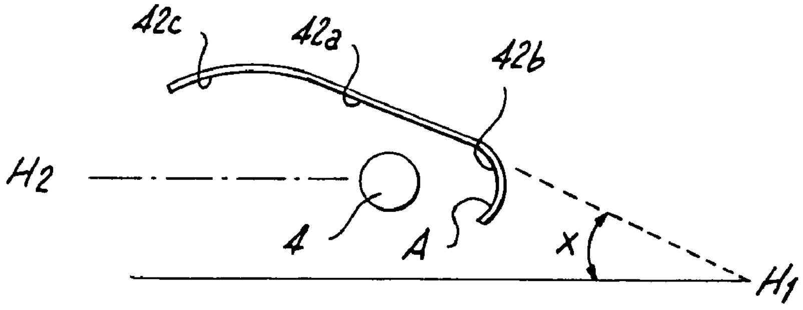
FIG. 5B is a close-up detail side view showing the reflectance of the light rays of fluorescent lamps due to the angle and arc of another embodiment for the reflector having small arcuate concave portion, an oblique portion and an inner arcuate concave portion.

FIG. 5B shows another embodiment of the reflectance of the light rays 64, 65 and 66 of fluorescent lamps 4 due to the angle and arc of the reflector having a first arcuate concave outer portion 42*c*, a second straight oblique portion 42*a* and a third inner arcuate concave portion 42*b*. While the preferable percentage of uplighting is 5 to 19 percent of emitted light reflected above imaginary line H2, that percentage of uplighting can be varied by adjusting the angle of oblique reflector portion 42*a*, inner arcuate concave portion 42*b* and/or outer arcuate concave portion 42*c* of reflector 42.

Besides the differences in the configuration of reflector 42 and in the variations in angle X shown in FIGS. 5A and 5B, the actual size of reflector 42 and its location (i.e. distance from) relative to lamp 4 also have a bearing on the percentage of uplighting.

Figure 10:
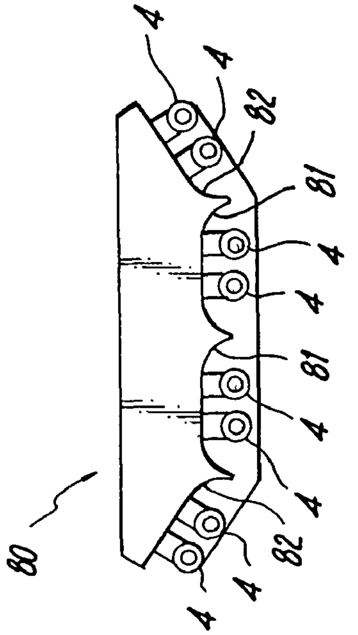
FIG. 10 is an End view of an 8-lamp configuration of a fluorescent lamp fixture of this invention.
Figure 9:
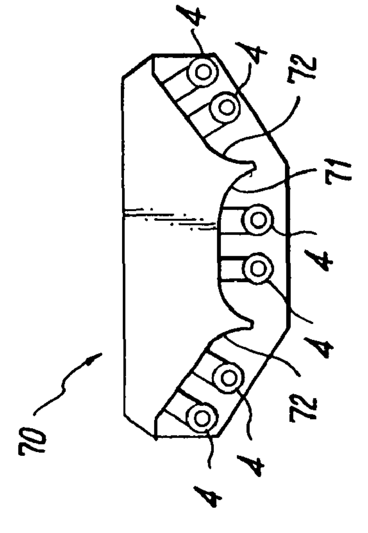
FIG. 9 is an End view of a 6-lamp configuration of a fluorescent lamp fixture of this invention.

FIG. 9 shows a 6-lamp design 70 with two lamps in central reflector 71 as well as in each of two side reflectors 72. FIG. 10 shows an 8-lamp fixture 80 with two down reflectors 81 in the central section with two lamps each. oblique side reflectors 82 also have two lamps each.

While FIGS. 1 and 2 show pendant pipe 11 attached to pendant bracket/stabilizer 10 and to the lighting fixtures, the attachment at the top end is not defined. In an installation such as a gymnasium, where the fixture may be impacted, the top end is rigidly attached to a sturdy attachment, such as, for example, a ¾ inch galvanized conduit stem. The pipe end is retained by a screw; the installation insures proper leveling and is aesthetically pleasing.

Figures 11, 12:
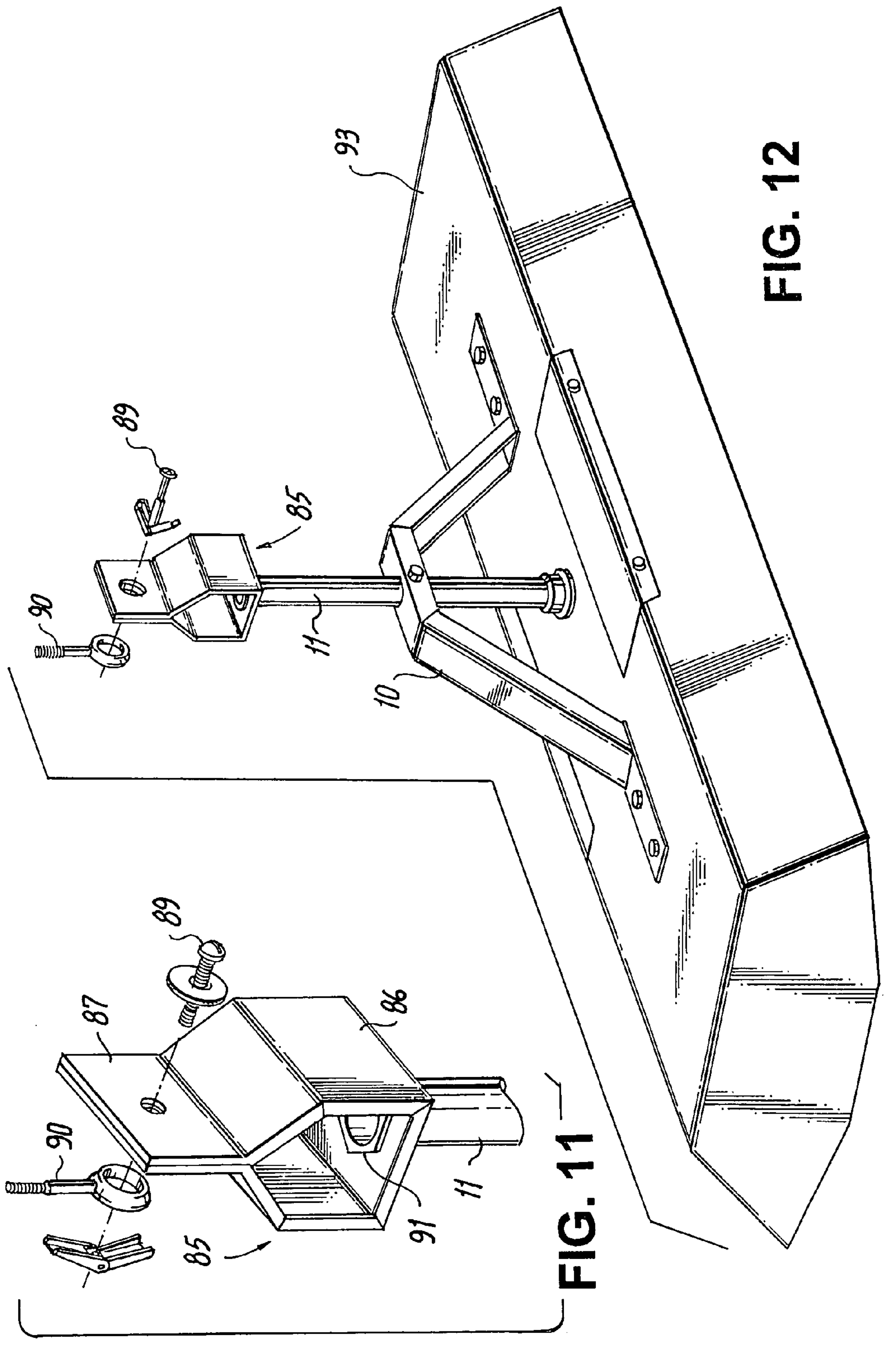
FIG. 11 is a perspective view of a toggle hanger of this invention showing attachments to a pendant pipe at the bottom and an eyebolt at the top.
FIG. 12 is a perspective view of the toggle hanger of FIG. 11 attached to a lighting fixture.

However, if impact is not an issue, a more cost effective self-leveling method of attachment is possible. Toggle hanger 85 shown in FIGS. 11 and 12 easily permits attachment to a preattached ceiling mounted holder, such as an eyebolt 90 (or hook) using a toggle bolt 89 through a hole in mounting flange 87 of toggle hanger 85. Toggle hanger 85 is an inexpensive sheet metal component with housing 86 portion, which permits attachment of the top end of pendant pipe 11 through a hole in the horizontal member and retention via a fastener, such as nut 91. Proper leveling of fixture 93 is assured by the pivoting attachment.

Figure 13:
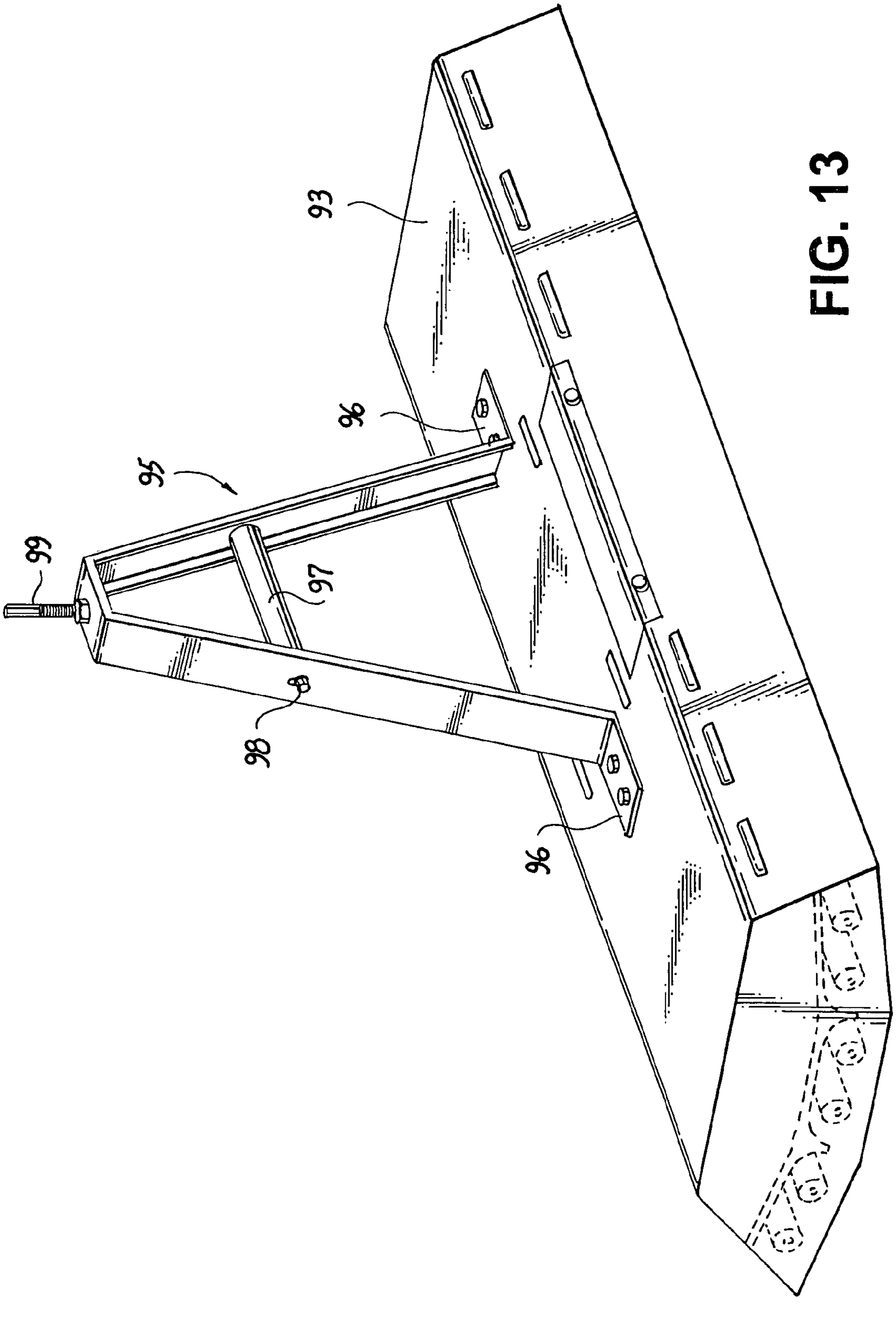
FIG. 13 is a perspective view of a quick bracket™ of this invention attached to a lighting fixture and also showing the removable mounting handle.

A second cost effective and labor saving attachment method uses the quick bracket 95 of this invention as shown in FIGS. 13-15. This is an economy hanger system which eliminates the need for the pendant pipe. Bracket 95 is available in stepped sizes (h=18"-48") to accommodate a variety of hanging distances from the ceiling. The wide distance between attachment feet 96, coupled with the wide width dimension act as a stabilizer to insure proper leveling of fixture 93. Handle 97 is totally portable and goes from fixture to fixture to allow for ease of handling and holding during installation. Slotted holes 98 in the sides of quick bracket™ 95 permit entry of screw heads at the bottom end, but retain screws securely at the top end thereby facilitating convenient attachment and detachment of optional mounting handle 97 which has fasteners, such as screws, protruding each end. The distal end of quick bracket™ 95 accepts a threaded rod 99 as shown; alternatively, a hook can be fastened which would readily couple with a pre-installed eye bolt. The ceiling mounting hardware and labor involved is much reduced from that required for a properly installed stem hanger.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A method for installing a lighting fixture housing to a ceiling comprising the steps of:

installing a ceiling mounted holder to a ceiling, said ceiling mounted holder having an open ring portion for insertion of a widenable toggle therethrough;

attaching a pendant pipe to a flat top surface of a lighting fixture having an longitudinally extending end to end axis;

inserting said pendant pipe through a top face of a trapezoidal pendant bracket having two obliquely extending arms attached at respective proximal ends to said top face of said trapezoidal pendant bracket, said pendant bracket further having two oppositely opposed flat feet extending longitudinally along a flat top surface of the fluorescent lamp fixture;

aligning said feet of said trapezoidal pendant bracket so that they are in axial alignment with said longitudinally extending end to end axis of said lighting fixture housing;

attaching said feet of said trapezoidal pendant bracket to the flat top surface of the lighting fixture housing;

attaching an upper distal end of said pendant pipe to a further pipe-accommodating holder having an upper mounting flange;

providing a hole in said upper mounting flange of said further pipe-accommodating holder;

locating said hole in said upper mounting flange in positional register with said open ring portion of said ceiling mounted holder;

inserting a threaded toggle bolt having a widenable toggle nut thereon through said hole of said upper mounting flange of said further pipe-accommodating holder and through said open ring portion of said ceiling mounted holder;

permitting said widenable toggle nut to widen and prevent movement of said toggle nut back though said open ring portion of said ceiling mounted holder, thereby suspending the lighting fixture housing from said ceiling mounted holder.

2. The method as in claim 1 wherein said ceiling mounted holder is an eyebolt.

3. The method as in claim 1 wherein said ceiling mounted holder is engageable with a hook.

* * * * *